United States Patent [19]

Rhodes

[11] 4,153,144

[45] May 8, 1979

[54] IMPACT ABSORBING DEVICE

[76] Inventor: Jack K. Rhodes, 4500 Pleasant Hill Rd., Kelso, Wash. 98626

[21] Appl. No.: 849,505

[22] Filed: Nov. 7, 1977

[51] Int. Cl.² .............................................. F16F 7/10
[52] U.S. Cl. ..................................... 188/266; 293/132
[58] Field of Search ............... 188/1 R, 1 B, 129, 139, 188/266, 267, 288; 35/19 R; 293/60, 70, 72, 84, 85, 89; 16/82, 83; 273/102.1 C, 127 R, 127 D, 53

[56] References Cited

U.S. PATENT DOCUMENTS

| 1,890,950 | 12/1932 | Sharp | 35/19 R |
|---|---|---|---|
| 2,957,554 | 10/1960 | Ballard et al. | 188/288 |
| 3,243,203 | 3/1966 | Hermiz et al. | 293/60 |
| 3,319,959 | 5/1967 | Lenhart | 273/53 |
| 3,360,079 | 12/1967 | Van DeBerg | 188/1 B |
| 3,700,033 | 10/1972 | Bosch | 188/288 |

FOREIGN PATENT DOCUMENTS

| 2540107 | 3/1977 | Fed. Rep. of Germany | 188/267 |
|---|---|---|---|
| 364841 | 11/1938 | Italy | 188/266 |
| 526507 | 5/1955 | Italy | 188/266 |

Primary Examiner—Edward R. Kazenske
Attorney, Agent, or Firm—Kolisch, Hartwell, Dickinson & Stuart

[57] ABSTRACT

An impact-absorbing device which includes an impact-receiving member pivotally mounted on a frame, an upwardly inclined track, and a plurality of weighted energy-transfer members freely movable in the track in response to striking by the impact-receiving member upon impact occurring. Following impact, the rest position of the impact-receiving member is re-established, serving to isolate the impact-receiving member and the downwardly moving energy-transfer members.

8 Claims, 8 Drawing Figures

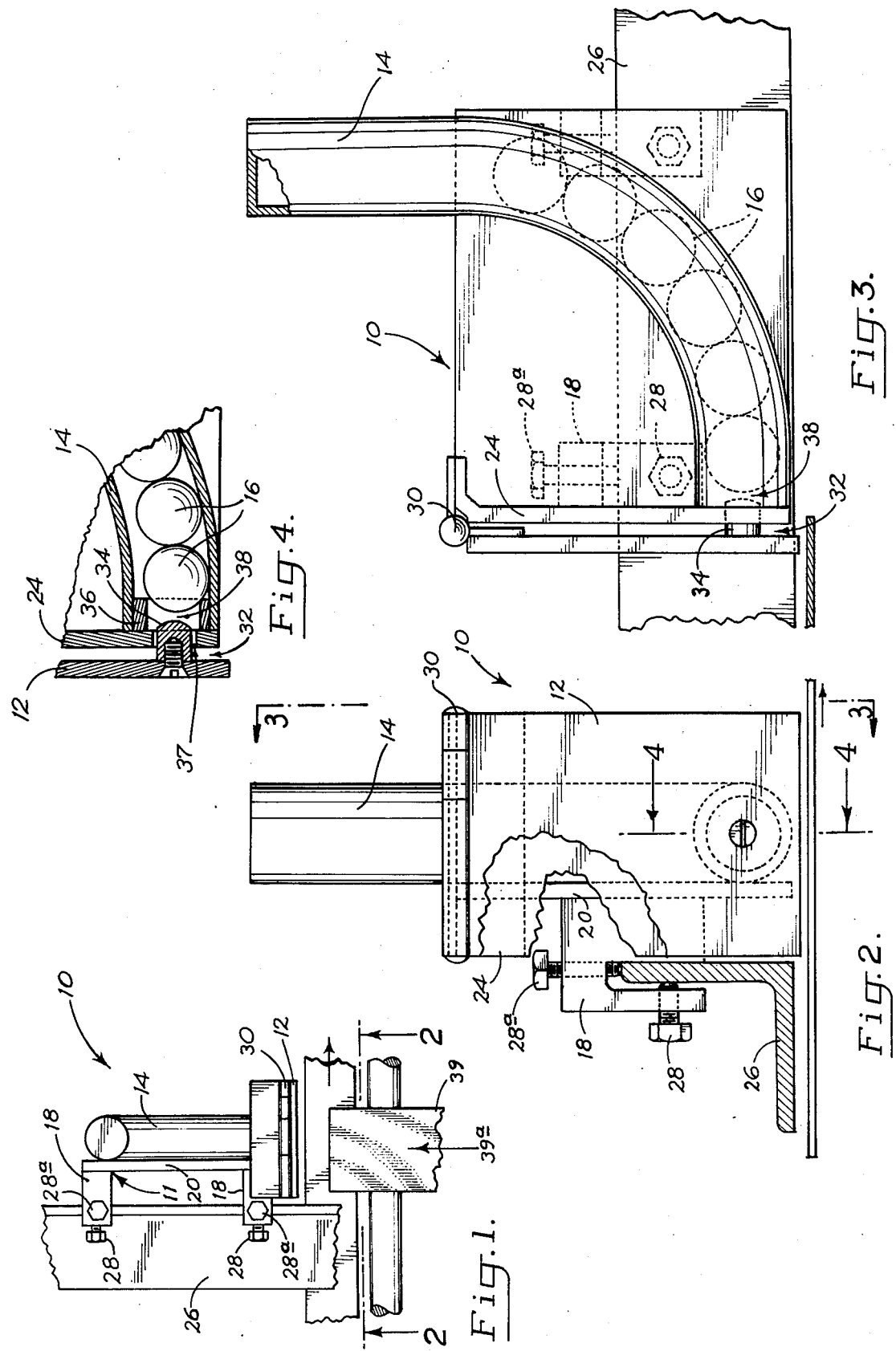

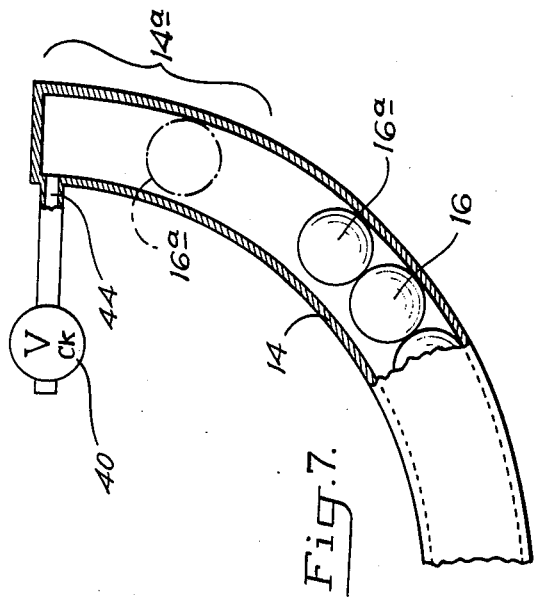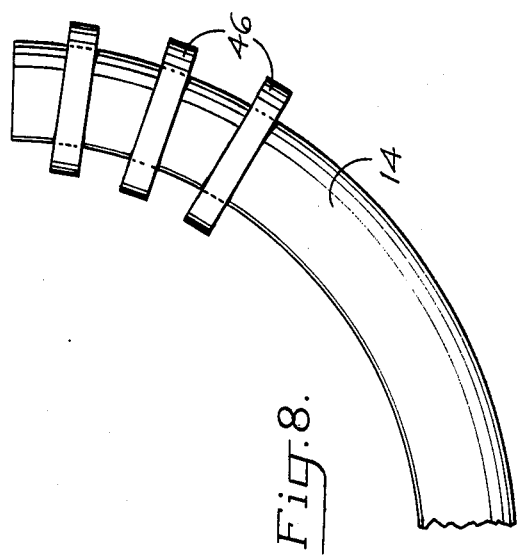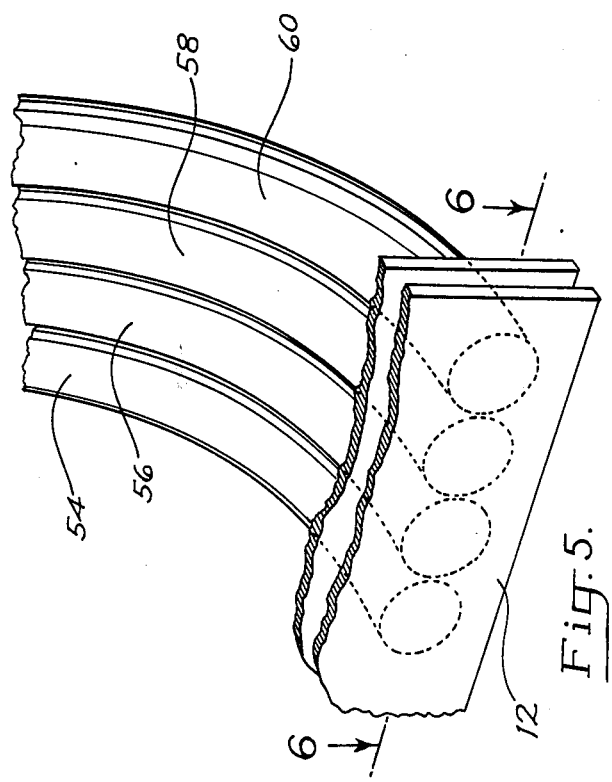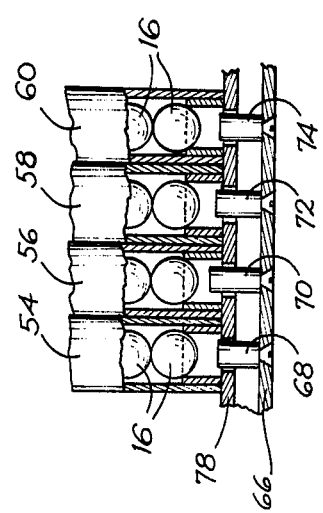

IMPACT ABSORBING DEVICE

BACKGROUND AND SUMMARY OF THE INVENTION

This invention relates to energy dissipating devices and more particularly to an impact absorbing device utilizing movable energy transfer members.

In a variety of situations in which a work piece is to be moved from one work area to another, it is desirable to brake this work piece in a precise position. Various stopping devices for arresting a moving work piece have been used previously.

One such type of impact receiving device provides a fixed impact surface. Characteristically, the impact between the traveling work piece and the fixed surface results in either an inelastic collision, which may damage the work piece, or an elastic collision, which tends to rebound the work piece backwards far beyond the point of impact.

Another type of existing impact receiving device is mounted on spring or hydraulic supports, and is thus movable upon impact. Although such movable impact receiving devices tend to dissipate the energy of the impact, they have generally been unsatisfactory in properly positioning the work piece after impact. This problem is particularly difficult to solve in cases where impacting objects may have widely varying weights or impact energies.

The present invention provides means for imparting the energy of an impacting body to one or more of a plurality of weighted objects. The number of bodies to which the impact energy is imparted and the extent of motion imparted to such bodies depends on the force of impact.

A general object of the present invention is to provide a simple device which overcomes the above-described disadvantages of prior impact and receiving devices.

It is another object of the present invention to provide an impact receiving device capable of dissipating the energy of impact of a moving object and stopping the object substantially at the point of impact.

Yet another object of the invention is to provide such an impact absorbing device capable of effectively dissipating the impact energy of objects having widely varying impact forces.

BRIEF DESCRIPTION OF THE DRAWINGS

These and other objects and features of the present invention will now be more fully described in conjunction with the accompanying drawings, wherein:

FIG. 1 is a top plan view of an impact absorbing device according to the invention showing a work piece such as a board approaching the device;

FIG. 2 is an enlarged front elevation view taken along the line 2—2 in FIG. 1;

FIG. 3 is a side elevation view taken along line 3—3 in FIG. 2;

FIG. 4 is a cross-sectional, fragmentary view taken along line 4—4 in FIG. 2;

FIG. 5 is a fragmentary perspective view of another embodiment of the invention employing a plurality of side-by-side tubes;

FIG. 6 is a sectional view taken along line 6—6 in FIG. 5;

FIG. 7 is a fragmentary, partially cutaway view of the tube in an embodiment of the invention employing fluid pressure to retard the motion of weighted spheres within a tube; and FIG. 8 is a fragmentary view of a tube in an embodiment of the invention using a magnetic field to retard the motion of weighted spheres within the tube.

DETAILED DESCRIPTION OF THE INVENTION

Referring to the drawings and first, specifically, to FIGS. 1-3, there is shown an impact absorbing device 10 according to an embodiment of the invention. The device generally includes a frame 11, impact receiving means, such as impact receiving plate 12, an upwardly inclined track such as the closed tube 14, and a plurality of weighted energy transfer members movably mounted within the track, such as the metal spheres 16 in tube 14 as shown in FIGS. 3 and 4.

Frame 11 comprises a pair of frame brackets 18, and a frame side member 20 attached thereto. Frame side member 20 rigidly supports an upright frame plate 24. The frame is adapted for mounting to an angle iron frame support 26 by means of the two bracket clamping screws 28, as illustrated in FIGS. 2 and 3. The vertical position and tilt of frame side member 20 is adjustable by means of two plate angle adjustment screws 28a which contact the upper edge of frame support 26.

Impact receiving plate 12 is attached to the frame for substantially reciprocal motion between an at rest position and an impact position. In the embodiment shown, the upper portion of the impact receiving plate is connected to the upper portion of frame plate 24 by means of a hinge 30, providing a gap 32 between the impact receiving plate and the frame plate when plate 12 is in its vertically disposed at rest position. Attached to the lower portion of the impact receiving plate is a striker portion or striker 34 which extends inwardly through an opening 37 in frame plate 24 and slightly into tube 14.

Tube 14 is rigidly attached to the bottom portion of frame plate 24 and additionally may be attached to frame side member and the side of the tube. The tube has an open end adjacent the impact receiving plate and, as is best seen in FIG. 3, curves upwardly on progressing away from the impact receiving plate.

The energy transfer spheres 16 are supported in a row within this tube and are freely movable therein. The spheres are maintained within the tube at the lower end of the tube by stop means which is preferably a collar, 36, the diameter of which is less than the diameter of the spheres 16. Collar 36 thus spaces spheres 16 from striker 34, forming therebetween a rest position gap 38. This gap is determined by the dimensions of collar 36, the length of the striker, and the angular position of the impact receiving plate relative to the frame plate. The rest position gap may be adjusted by varying the tilt of the frame side member by means of the plate angle adjustment screws 28a. . Explaining further, to increase gap 38 screws 28a are adjusted to raise the rear end of tube 14 relative to plate 12.

In operation, the impact receiving device is oriented with impact receiving plate 12 facing in the direction of travel of a moving work piece, such as the board 39, as shown in FIG. 1. When the board moved on rollers in the direction of arrow 39a strikes receiving plate 12, this plate is swung toward plate 24 closing gap 38 between striker 34 and the sphere adjacent collar 36, until impact between the striker and sphere occurs. Depending on the force of the impact one or more of the distally disposed spheres will be thrown upwardly within the top portion of the tube. The device thus provides for the dissipation of impulses of varying magnitude through the upward movement of one or more of the spheres.

Immediately after impact, those spheres lowermost in the tube which were not impelled upwardly upon impact return to their at rest positions, moving the impact receiving plate back to its at rest position. The work piece is thus stopped at a desired position without appreciable rebound. After the distally disposed spheres which were thrown upwardly in the tube upon impact return to their at rest positions, the device is ready to receive impact from another traveling work piece.

In FIG. 7, there is shown an embodiment of the invention having means operable to entrap a body of compressible fluid within the tube above the spheres for the purpose of retarding the upward motion of the spheres 16 upon impact occurring. In the embodiment shown, air is admitted into the top of the tube through a check valve 40 and inlet port 42. As is seen in FIG. 7 the tube is narrowed at its upper end section 14a to an inner diameter only slightly greater than the diameter of the spheres. Thus as the distal sphere 16a is thrown upwardly into section 14a, it traps a body of air therein which retards its upward travel.

It can be appreciated that the upward movement of the distally disposed sphere upon impact occurring is partially dissipated by the increased air pressure which the upwardly projected sphere encounters as it approaches the top of this tube. This increased pressure can be used to adjust the total force which can be dissipated by the device; that is, the air cushion effect in the upper portion of the tube allows the spheres to receive and dissipate a greater impact force without hitting the stop of the tube.

In FIG. 8 there is shown yet another embodiment designed to retard the motion of the spheres within the tube upon impact. This embodiment includes magnetic means operable to provide magnetic flux within the tube for retarding the upward movement of the spheres within the tube upon impact. As shown, the magnetic means may be annular magnets 46 which are preferably electromagnets, the actuation and magnetic strength of which can be controlled by conventional control devices. The upper portion of the tube is preferably a material of low magnetic susceptibility, allowing the magnetic flux lines to penetrate the tube, and the spheres must be of a ferromagnetic material such as steel. Means may be provided for switching the electromagnet off and on to retard upward movement of the spheres, but thereafter to allow free return to their at rest positions.

In FIGS. 5 and 6 there is shown another embodiment of an impact receiving device according to the invention. This device provides a plurality of tubes 54, 56, 58, 60 each containing therein a plurality of energy dissipating spheres 16 for dissipating energy received from a single impact receiving plate 66. As seen in FIG. 6, plate 66 has a plurality of strikers 68, 70, 72, 74 thereon which communicate with the tubes through openings adjacent the frame plate 78. These strikers are of varying lengths to project within the tube openings varying distances, so that the rest position gaps between strikers and adjacent spheres varies from tube to tube. This configuration increases the total range of impact energies which the device is capable of dissipating. For example, a low energy impact may be completely dissipated by the striking of only one striker against the corresponding adjacent sphere, whereas a greater impact may require the consecutive striking of all the strikers against the corresponding adjacent spheres.

It can be appreciated that variations and modifications are possible without departing from the spirit of the invention, which is encompassed by the following claims.

It is claimed and desired to secure by Letters Patent:

1. An impact absorbing device comprising
   a frame,
   an impact receiving member pivotally mounted on said frame for swinging movement between a substantially vertical at rest position and an impact position, said impact receiving member having a striker portion thereon,
   an upwardly inclined track attached to said frame and having an open end adjacent said impact receiving member,
   a plurality of weighted energy transfer members including a lower transfer member adjacent said open end, said members being freely movable in said track for upward movement therein in response to movement of said impact receiving member from its said at rest position to its said impact position whereby impact between said striker portion and said lower member occurs upon an impact occurring with said impact receiving member, and reciprocal downward movement therein following such impact, and
   stop means limiting downward movement of said lower member to a position spaced from said striker portion when said impact-receiving member is in its said at rest position.

2. The device of claim 1 wherein said track curves upwardly on progressing away from said impact receiving member and said energy transfer members comprise weighted spheres aligned in a row extending along said track.

3. The device of claim 2 wherein said track is closed along its upper portions and said device further includes means operable to create a fluid pressure gradient within said track for retarding such upward movement of said spheres within said track upon impact occurring.

4. The device of claim 2 wherein said spheres are ferromagnetic, said device further including magnetic means operable to provide magnetic flux within said track for retarding such upward movement of said spheres within said track upon impact occurring.

5. The device of claim 1 further comprising retarding means operable to retard upward movement of said energy transfer members upon impact occurring.

6. The device of claim 1 which further comprises adjusting means for selectively adjusting the distance between said striker portion and said lower transfer member.

7. The device of claim 6 wherein said adjusting means includes means for adjusting the vertical disposition of said frame.

8. An impact absorbing device comprising
   a frame,
   an impact receiving member pivotally mounted on said frame for swinging movement between a substantially vertical at rest position and an impact position, said impact-receiving member having a plurality of strikers thereon,
   a plurality of upwardly inclined, substantially aligned tracks rigidly attached to said frame, each track having an open end adjacent said impact receiving member, a plurality of weighted energy transfer members including a lower transfer member contained within each said track with said lower member in each said track being adjacent the associate open end thereof, said members being freely movable in each respective said track for upward movement therein in response to movement of said impact receiving member from its said at rest position to its said impact position whereby impact between an associated said striker and lower member occurs upon an impact occurring with said impact receiving member, and reciprocal downward movement therein following such impact, and stop means associated with each of said tracks for limiting downward movement of the lower member within each said track to positions spaced varying distances from said strikers when said impact receiving member is in its said at rest position.

* * * * *